United States Patent [19]

Matt

[11] 4,166,246
[45] Aug. 28, 1979

[54] DIGITAL CONTROL SYSTEM FOR AUTOMATICALLY COMPENSATING FOR CONVEYER MOVEMENT CHANGES

[75] Inventor: Timothy S. Matt, Cleveland, Ohio

[73] Assignee: Nordson Corporation, Amherst, Ohio

[21] Appl. No.: 871,728

[22] Filed: Jan. 23, 1978

[51] Int. Cl.² ............... B07C 5/08; H03K 21/30
[52] U.S. Cl. .................................. 328/5; 328/75; 328/129; 209/564
[58] Field of Search .................. 328/5, 75, 129; 209/563, 564, 565, 566

[56] References Cited

U.S. PATENT DOCUMENTS

| | | | |
|---|---|---|---|
| 3,532,907 | 10/1970 | Kasper | 307/293 |
| 3,532,990 | 10/1970 | Kasper | 328/5 |
| 3,813,524 | 5/1974 | Coberley | 235/92 T |
| 3,955,678 | 5/1976 | Moyer | 209/564 |
| 4,112,379 | 9/1978 | Schmidt | 328/5 |

Primary Examiner—John S. Heyman
Attorney, Agent, or Firm—George J. Coghill

[57] ABSTRACT

A digital control system is disclosed for activating a responsive device, such as a dispenser, at a preselected time after an initiating event, for a predetermined duration period. The system can be used for example in the packaging industry to apply adhesive at precise locations on a box moving on a conveyor. The system automaticaly compensates for conveyor speed and for the pull-in time and/or drop-out time of the responsive device.

21 Claims, 7 Drawing Figures

DIGITAL CONTROL SYSTEM FOR AUTOMATICALLY COMPENSATING FOR CONVEYER MOVEMENT CHANGES

FIELD OF THE INVENTION

This invention relates to control systems and more particularly relates to a control system utilizing digital techniques for use in conjunction with a conveyor for moving objects wherein the control system is to activate a responsive device which will act on the moving objects.

BACKGROUND OF THE INVENTION

In many phases of manufacturing there is a need to activate a responsive device which will act on a moving object. In the packaging or product assembly phases of manufacturing, for example it is often desired to apply a bead of adhesive of a given length to a specific area of an object while the object moves on a conveyor past a dispensing device. Generally, the dispenser must be turned on and off at precise times in order to apply the adhesive to the proper area on the object. For ease of understanding the invention can be described in terms of this one specific application. Many other applications are possible.

In order to activate the dispenser in automated systems, a sensor is generally employed to detect articles moving on the conveyor. The sensor is generally located to sense the articles upstream from the dispenser. Therefore, the activation of the responsive device must be delayed for some period of time after an article is sensed, specifically, until the object reaches the dispenser. Thereafter, the dispenser is activated for some given duration of time, during which adhesive is applied to the object.

The amount of time for which the start of the activating control signal must be delayed and the duration of the activating signal are influenced by many factors, i.e.: conveyor speed; distance from the sensor to the dispenser; the distance between the triggering edge of the object and the location on the object where the bead is to start (for turn on) or bead length (for turn off); and the time required for the dispenser to turn on in response to a control signal (or drop out in response to removal of the control signal), or other system delays which are constant as a function of time irrespective of conveyor speed.

In an automated system wherein the conveyor always moves at the same speed, the amount of time which elapses between the time the object is sensed and the time the object is in proper position for dispensing adhesive is always the same. Also, the time for which the dispenser must be activated in order to apply a given length of an adhesive bead will again be constant. These times can be calculated. Therefore, it is a straightforward matter to simply delay activation and deactivation of the dispenser for a calculable time. Further, if there is a significant delay between the time an activating signal from a control circuit is generated, and the time a dispenser actually turns on (pull-in time) or turns off (drop-out time), these delays in dispenser actuation and deactuation can be included in the calculation to determine the precise time at which a control signal must be applied and removed from an automatic dispenser after a triggering event.

However, in many manufacturing facilities in operation today conveyor speed is variable within a fairly large range. Therefore, it is desirable to provide an automatic control circuit for actuation and deactuation of the dispensers wherein changes in line conveyor speed are compensated for automatically.

One approach to providing such a system is disclosed in U.S. Pat. No. 3,532,990. This patent discloses an analog system designed to automatically compensate for changes in conveyor speed as described above. That system is limited in many respects. Analog systems in general are prone to drift with time or temperature. Set up procedure, operating characteristics, and calibration procedures for that system appear to be very complex and susceptible to inaccuracies as far as calibration, set up and response to chamnges in system operating parameters.

Another system to solve the problem is disclosed in U.S. Pat. No. 3,813,524. That system is a digital system, and although its digital nature overcomes some problems associated with an analog system, it is a complex system which has a limited versatility. The system requires calculations in order to calibrate the system for any given installation, and further appears to be able to compensate only for the pull in time of the dispenser and not for the drop out time of a dispenser. The logic of the circuitry puts limitations on the operation of the system. The system cannot be retriggered until a complete dispensing cycle had been completed, that is until the gun is turned off. Further, the logic of the system necessitates circuit elements or functions not necessary in the system of the present invention described below.

All of the prior art systems were limited either in accuracy or versatility, or were overly complex.

It is an object of the present invention to provide an automatic control system which is more versatile, accurate and less complex than the prior art.

In the present invention, a digital circuit is provided which delays actuation or deactuation of the responsive device as a function of conveyor travel rather than time. Therefore, actuation/deactuation is delayed until the object is in proper position notwithstanding the time required for the object to arrive at this position. Thus, the actual time delay in actuation will be dependent on conveyor speed.

In one aspect of the preferred embodiment of the invention, the system comprises a photosensor, pulse tachometer, a distance or "lead length" counter, timer and control circuitry. The pulse tachometer generates one pulse for each predetermined increment of conveyor travel (each millimeter for example). In its application to automatic dispensing of adhesive onto moving objects, the counter is set to a predetermined count representing the distance between the leading triggering edge of an object to be treated and the point on the object where adhesive is to begin to be applied to the object, plus the distance between the photosensor and the dispenser, the total delay required being dependent upon the travel required for the object to travel from the sensor to the dispenser plus the distance from the triggering edge of the object where application is to begin. In other words, the counter is set to a number representing the travel of an object between its position where it is sensed and its proper position for the start of adhesive application.

With the counter being set to this predetermined number, a signal from the photosensor and control circuitry causes the counter to count pulses from the tachometer from this predetermined number to a preselected number. In the preferred embodiment the counter counts down to zero. Having the counter count to a preselected number, e.g. zero, reduces the complexity of the circuit and number of components. At a count of zero the conveyor will have moved the object to the proper position at which to treat the article. At the count of zero the counter generates a signal to start the responsive device.

A second distance counter, "bead length" or "duration" counter, can be provided to control the duration of the operation of the responsive device, such as to control the bead length of the adhesive applied to the object. In the example of an adhesive dispenser this second counter is preset to a predetermined count representing the bead length desired. A signal derived from the zero count of the first counter causes the second counter to count tachometer pulses until this second counter reaches a preselected count, preferably zero. At a zero count on the second counter the object has traveled the desired bead length and the responsive device or dispenser is deactivated and a dispensing cycle is completed. After the respective counters have reached zero, control circuitry presets the counters to their respective predetermined counts so that the counters are ready for another object.

As mentioned above, there are fixed time-dependent delays associated with almost all automatic systems. In the example of the adhesive dispenser the most notable fixed time delay characteristic of the system is caused by the mechanical devices; e.g. the time required for a dispenser to actually dispense after a control signal has been generated, or to stop dispensing after the control signal has been removed. In general these delays will be constant at any conveyor speed. Thus, it can be appreciated that, because of these fixed delays in response, the dispenser will not actually apply adhesive to the object until some fixed time after a control signal is generated. Because the delay is fixed as a function of time the conveyor travel will, for this fixed time, vary depending on the speed of the conveyor. At higher conveyor speeds this error can be significant.

It is an object of the system comprised of the present invention to provide a system which compensates for these fixed delays at any conveyor speed. According to the present invention it has been recognized that, because of these fixed delays, the control signal must be generated at an earlier time than would be required if no fixed delays were involved. The control signal must be generated earlier by a time equal to the delay which is affecting operation.

In the present invention compensation for fixed delay is effected by periodically presetting the distance counters to their predetermined counts and immediately causing the counters to count tachometer pulses for a time equal to the fixed delays associated with the function controlled by the counter. In other words, the count in the counter is reduced by the number of pulses occurring within the period of the fixed delays. Therefore, when counting in response to a sensed object the counter will reach the preselected count (zero) earlier in time by an amount equal to the fixed delays associated with the function controlled by the counter, and at any conveyor speed. Therefore, the counters provide a control signal to the responsive device at a time which allows the responsive device to actually initiate its function when the object is at the proper position.

This periodic updating is repeated until an object is sensed by the photosensor. Thus, the conveyor speed for which compensation has been made is sensed very close in time to any activation of the control system by the photosensor. The time between periodic updates will depend on how fast conveyor speed can change, and therefore may be different in different applications.

Each travel related counter is individually compensated for fixed time delays associated with the counter. Independent compensation can be provided for both pull-in and drop-out fixed time delays. For example, in the presently considered application to an adhesive dispenser, the lead length counter is compensated for pull-in delays and the bead length counter is compensated for drop-out delays.

Thumb wheel switches having coded outputs compatible with the counters can be used to adjustably set the counters to their predetermined counts. The system is calibrated so that operating adjustments can be set in standard units of measure, e.g. milliseconds and millimeters. When used with an adhesive dispensing apparatus, the desired bead length of adhesive can be dialed in directly in millimeters, for example. The distance between the dispenser and sensor is added to the distance behind the leading triggering edge of the object at which the bead is supposed to start and this total distance is dialed directly into the system in standard units of measure. The bead length is likewise dialed in in standard units of measure. The compensation timers are then adjusted to the proper duration to correspond to pull-in time and drop-out time of the responsive device.

BRIEF DESCRIPTION OF THE DRAWINGS

The invention can be more fully appreciated by reference to the accompanying drawing figures in which.

DESCRIPTION OF THE PREFERRED EMBODIMENT

Figure 1:
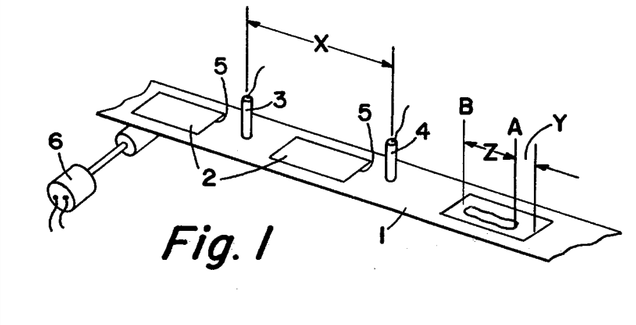
FIG. 1 is a functional representation of a conveyor adapted for use with an automatic dispensing device.

The present invention is designed for use in an automated system wherein a responsive device is to be actuated or deactuated automatically in response to some initiating event, such as the passing of an object or article on a conveyor past a sensor. One example of such a system is depicted in FIG. 1. FIG. 1 depicts a conveyor 1 upon which articles 2 are being transported past a sensor 3 and an adhesive dispenser 4. The conveyor speed is variable and successive articles can be located on the conveyor 1 without any regular distance between them. The sensor 3 is located proximate the conveyor 1 so as to detect articles 2 passing thereon. The sensor 3 is oriented so that the front leading edge 5 of the articles 2 will trigger the sensor 3. The automatic dispenser 4 is located a distance X downstream from the sensor 3 and is positioned so as to deposit adhesive along the top surface of the articles 2.

Adhesive is to be applied to the articles 2 starting at Point A, a distance Y from the leading triggering edge of the article and continue for a distance Z to point B on the article. It can be appreciated from the layout of the components with respect to the conveyor 1 and with respect to each other that a delay will be required from the time the leading edge 5 of an article 2 triggers the sensor 3 until the time that point A on the sensed article 2 will be oriented underneath the dispensing device 4. The sensed article 2 must travel the distance X plus Y for this to happen. When point A is under the dispenser 4, adhesive should be applied to the article 2 and continue to be applied until point B on the article 2 is under the dispenser 4.

A pulse tachometer 6 is connected to a drive roller of the conveyor so as to generate output pulses for each incremental movement of the conveyor 1. In a preferred embodiment the pulse tachometer 6 is geared so as to provide one output pulse with a 50% duty cycle for each millimeter of conveyor travel. The pulse tachometer 6 provides an output which is used by the control circuit of FIG. 2 in order to properly sequence the on/off cycle of the dispenser 4.

The dispensing device 4 is an automatic dispensing device, that is, its actuation or deactuation is effected by a control signal driving a solenoid valve or the like. As with all mechanical systems having inertia, the dispenser 4 will exhibit some time lag between the time a control signal is applied to the solenoid and the time adhesive is actually dispensed. In general, this lag can be considered a fixed-delay-time characteristic of the device. Also, when turning the dispenser 4 off a possibly different lag will be experienced between the time a control signal is removed from the solenoid and the time adhesive actually ceases to flow. Again, this lag in deactuation is generally constant or fixed with respect to time.

Therefore, it can be appreciated that because of these lags the control signal to the dispenser 4 must be applied to the solenoid valve at a time earlier than the time at which point A on the article 2 is aligned with the dispenser 4. Specifically, the control signal must be applied at a point earlier in time equal to the fixed delay characteristics of the dispenser 4. That is, if there is a 10 millisecond delay between the control signal and dispensing then the control signal must be applied 10 milliseconds earlier than the time at which point A on the article is aligned with the dispenser.

Figure 2:
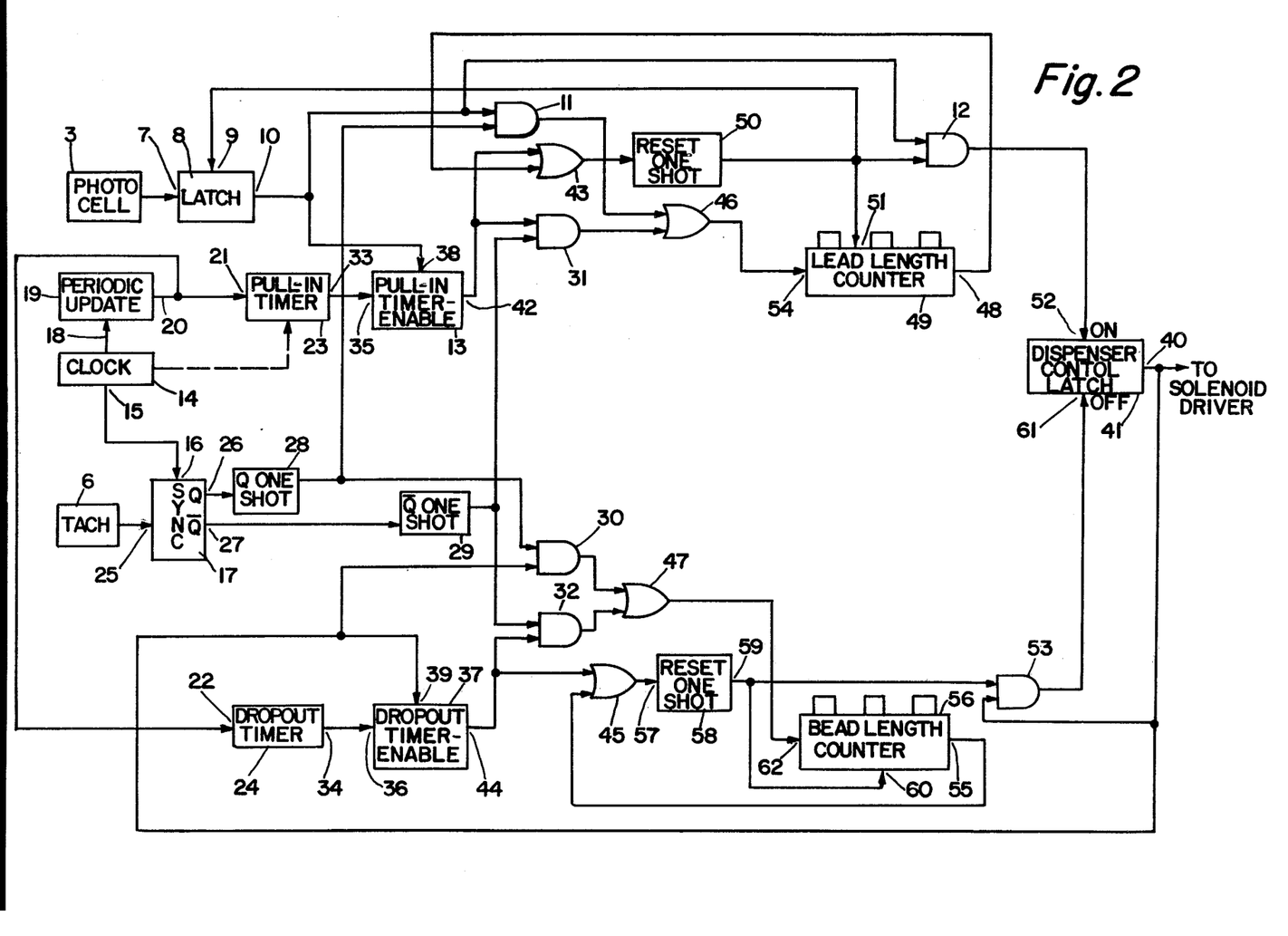
FIG. 2 is a block diagram of a system to control actuation of a dispensing device.

FIG. 2 is a block diagram of a digital system to control the actuation/deactuation of the dispenser in FIG. 1. The system of FIG. 2 controls the actuation/deactuation of the dispenser 4 so as to allow for both the time required for the article 2 to be in proper alignment, and for the fixed delay times associated with the dispenser 4. In the preferred embodiment the circuit is constructed with CMOS digital devices which operate in a positive logic mode and are effective to change logic state on the rising edge of a control signal. CMOS devices were selected in general for their noise immunity and reliability, however, other logic families can be utilized.

Inputs to the system are provided by a photocell 3 and a pulse tachometer 6, the photocell 3 to sense articles 2 passing on the conveyor 1 and to trigger the circuit, and the pulse tachometer 6 to be responsive to incremental movements of the conveyor 1.

The output of the photocell 3 is connected to a triggering input 7 of a photocell latch circuit 8. The photocell latch circuit 8 also has a reset input 9, and an output 10. Once triggered by the photocell 3 the output 10 of the latch 8 will change to and remain in a high state until a reset signal is applied to the reset input 9 of the latch 8. The output 10 of the latch 8 is connected to one input of a two-input first AND gate 11, one input of a two-input fifth AND gate 12 and also connected to one input of a pull-in timer-enable sequencing circuit 13.

A crystal controlled clock 14 having outputs of various frequencies provides a time base and synchronizes various system component operations. The clock 14 provides a 128 kilohertz output 15 to one input 16 of a synchronizing circuit 17, and also provides an output 18 to a periodic-update circuit 19. The periodic-update circuit 19 is effective to generate a 10 pulse per second output 20 derived from the input frequency from the clock 14. The output 20 of the periodic-update circuit 19 is connected to the triggering inputs 21 and 22 of the first and second timers 23 and 24 respectively.

The output of the pulse tachometer 6 is connected to a second input 25 of the synchronizing circuit 17 which is effective to synchronize the pulse tachometer 6 output to the system clock 14, so that rising edges of control pulses are synchronized. The synchronizing circuit 17 has a Q output 26 and a $\overline{Q}$ output 27. These outputs 26, 27 are connected to a pulsing circuit. The pulsing circuit comprises two individual one-shots 28, 29. The first one-shot 28 connected to the Q output 26 of the synchronizing circuit 17 will be referred to as the Q one-shot and the second one-shot 29 connected to the $\overline{Q}$ output 27 of the synchronizing circuit 17 will be referred to as the $\overline{Q}$ one-shot. The individual one-shots 28, 29 provide short duration pulses out of phase with one another, but both derived from the pulse tachometer 6. Thus, for every output pulse from the pulse tachometer 6 there will be one output from both one-shots, 28, 29 however out of phase. The output of the Q one-shot 28 is connected to the second input of the first AND gate 11 and also fed to the first input of a third AND gate 30. The output of the $\overline{Q}$ one-shot 29 is connected to a second input of a two-input second AND gate 31 and to a first input of a two-input fourth AND gate 32.

As stated above, the output 20 of the periodic-update circuit 19 is fed to first and second timers, 23, 24. Hereinafter the first timer 23 will be called the "pull-in timer" and the second timer 24 will be referred to as the "drop-out timer". The timers 23, 24 can be one-shots, or can be made from counters as will be more fully described below. The advantage of constructing the timers 23, 24 from counters lies in the greater accuracy of adjustment and operation of their output period. The timers 23, 24 are effective to provide an output signal for a specific settable and possibly adjustable time duration. This time duration will correspond to fixed delays in the operation of the responsive device, for example the pull-in or drop-out times of the dispenser 4. The outputs 33, 34 of the timers 23, 24 are separately connected to second inputs 35, 36 of respective timer-enable circuits 13, 37. The pull-in timer-enable circuit 13 has a first input 38 from the photocell latch 8 and an input 35 from pull-in timer 23. The drop-out timer-enable circuit 37 has a first input 39 from an output 40 of a dispense-control latch 41 and an input from the drop-out timer. The timer-enable circuits 13, 37 are effective to assure that the output of its respective timer has no effect on circuit operation if the respective timer is triggered under certain conditions which will be described below. The output 42 of the pull-in timer-enable circuit 13 is connected to a first input of a second two-input AND gate 31, and to one input of a first two-input OR gate 43. The output 44 of the drop-out timer-enable circuit 38 is connected to one input of the fourth two-input AND gate 32 and to one input of a second two-input OR gate 43.

The first two-input AND gate 11 derives its inputs from the photocell latch 8 and the Q one-shot 28. The output of the first AND gate 11 is connected to a first input of a third OR gate 46.

The second two-input AND gate 31 which derives its inputs from the pull-in timer-enable circuit 13 and the $\overline{Q}$ one-shot 29 has its output connected to a second input of the third OR gate 46.

The third two-input AND gate 30 which derives its inputs from the Q one-shot 28, and the output of the dispenser-control latch 41 (to be discussed later) has its output connected to a first input of a two-input fourth OR gate 47.

The fourth two-input AND gate 32 which derives its inputs from the $\overline{Q}$ one-shot 29, and from the drop-out timer-enable circuit 37, is connected to a second input of the third OR gate 46.

The first OR gate 43 having its inputs derived from the output of the pull-in timer-enable circuit 13 and a carry-out output 48 of a lead-length counter 49 (to be discussed below) has its output connected to an input of a lead-length reset one-shot 50. The output of the lead-length reset one-shot 50 is connected to the reset input 9 of the photocell latch 8, a preset input 51 of the lead-length counter 49, and one input of the two-input fifth AND gate 12. The output of the fifth AND gate 12 is connected to an "on" input 52 of the dispenser-control latching circuit 41. The output 40 of the dispenser-control latching circuit 41 is connected to a solenoid driver (not shown), and to one input of a two input sixth AND gate 53.

The output of the third OR gate 46 is connected to the clock input 54 of the BCD type lead-length counter 49. Details of the counter circuit 49 will be discussed below.

The second two-input OR gate 45 which derives its inputs from the drop-out timer-enable circuit 37 and from a carry-out output 55 of a bead-length counter 56 is connected to the input 57 of a bead-length reset one-shot 58. The output 59 of the bead-length reset one-shot 58 is connected to a preset input 60 of the bead-length counter 56 and to the second input of the sixth AND gate 53. The output of the sixth AND gate 53 is connected to a reset or "off" input 61 of the dispenser control latch 41.

The output of the fourth OR gate 47 is connected to the clock input 62 of the bead-length counter 56.

Many of the blocks included in the diagram of FIG. 2 are straightforward devices which need no further explanation to those skilled in the art. For example the OR gates, the AND gates, one-shots, crystal clocks, photocell triggers, and pulse tachometers. The timers can be simply adjustable one-shots which are well known to those skilled in the art. However, some of the blocks require some further explanation as to their use in this particular system.

Figure 3:
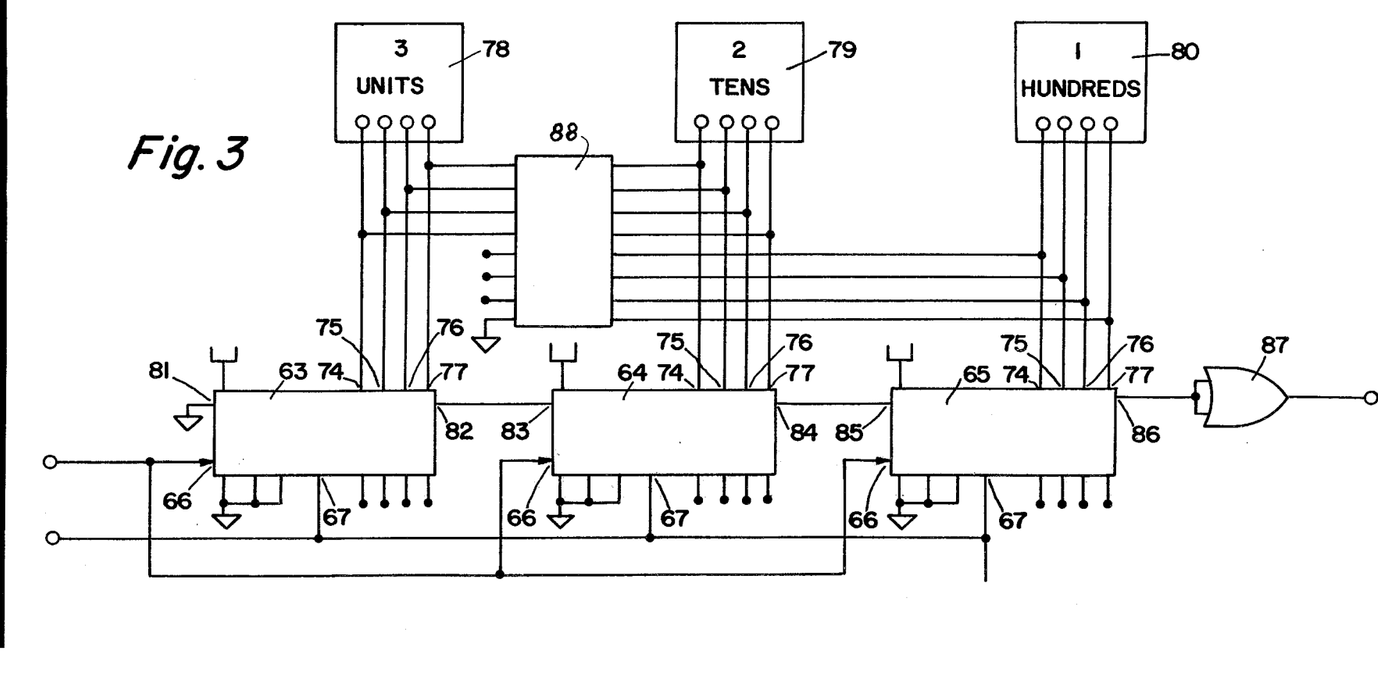
FIG. 3 is a schematic diagram of a digital counting circuit used in the system of FIG. 2.

FIG. 3 is a schematic diagram of a down counter which is acceptable to be used as either lead-length counter 49 or bead-length counter 56. As can be seen in FIG. 3 the counter consists of three individual BCD decade counters 63, 64, 65 cascaded together to form a three decade BCD counter, consisting of a units counter 63, a tens counter 64 and a hundreds counter 65. Each decade counter has a clock input 66, a preset input 67, a carry-out output 82, 84, 86 respectively and a carry-in input 81, 83, 85 respectively. Upon the occurrence of a rising edge of a pulse applied to the clock inputs 66 of the individual counters, the three decade cascaded counter will decrease by one count. That is, will decrease, for example, from a count of 111 to 110. Each individual decade counter is provided with four inputs 74, 75, 76, 77 to provide BCD programming capability. At the occurrence of a rising edge pulse applied to the preset inputs 67 of the individual decade counters 63, 64, 65, the individual decade counters 63, 64, 65 will be preset to the number represented in BCD code to the BCD programming inputs for that digit. Thumbwheel switches 78, 79, 80 connected to the BCD programming inputs 74, 75, 76, 77 of the decade counters 63, 64, 65 are provided in order to manually select the three digit count to which the counter is set upon the occurrences of a rising edge of a pulse applied to the preset inputs 67. Each decade counter has a carry-in input and a carry-out output. The carry-out output takes on a high state except when the carry-in input is at a low state and the count in that particular decade counter is at a zero count. The carry-in input 81 of the units decade is grounded. The carry-out output 82 of the units counter 63 is connected to the carry-in input 83 of the tens counter 64. The carry-out output 84 of the tens counter 64 is connected to the carry-in input 85 of the hundreds counter 65. The carry-out output 86 of the hundreds counter 65 is connected to an inverter 87 so as to provide a high state output as the carry-out output of the three decade counter when all three individual counters 63, 64, 65 are at a count of "zero". As stated above, for these particular decade counters a carry-out signal goes to a low state only when the carry-in input is at a low state and the decade count is "zero". Therefore, there will be a low state at the carry-out output 86 of the hundreds decade counter 65 only when all three decades are at a count of zero.

A biasing network 88 provides proper bias to the inputs of the decade counters 63, 64, 65. The biasing network comprises individual resistors for each BCD programming input terminal so as to connect the terminals to ground through the resistors so that they will not be floating when at a low state.

The counters of the system are designed to count down. That is, they count down from the number which is loaded into the counters upon the occurrence of a signal applied to the preset inputs 63. This is convenient so that comparators are unnecessary to detect when a count has progressed to a given count. Alternatively, the counters could be made to count upward. If the counters are to count upward then the thumbwheel switches having a nines-complement output should be used so as to load in the nine's complement of the number selected rather than the number itself.

Figure 4:
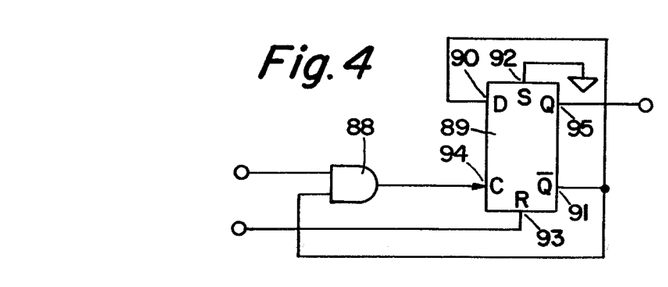
FIG. 4 is a schematic diagram of a digital latch for use in the system of FIG. 2.

FIG. 4 is a schematic diagram of a latching circuit acceptable to be used for the latches in the circuit of FIG. 2. The latch comprises a two-input AND gate 88 and a D-type flip-flop 89. The D input 80 of the flip-flop 89 is connected to the $\overline{Q}$ output 91 of the flip-flop 89 and to one input of the two-input AND gate 88. The "set" input 92 on the flip-flop 89 is grounded. The "reset" input 93 to the flip-flop 89 acts as the reset input to the latch. The second input to the two-input AND gate 88 comprises the triggering input to the latch. The output of the AND gate 88 is connected to the "clock" input 94 of the flip-flop 89. The Q output 95 of the flip-flop 89 acts as the output of the latch.

Figures 5, 6, 7:
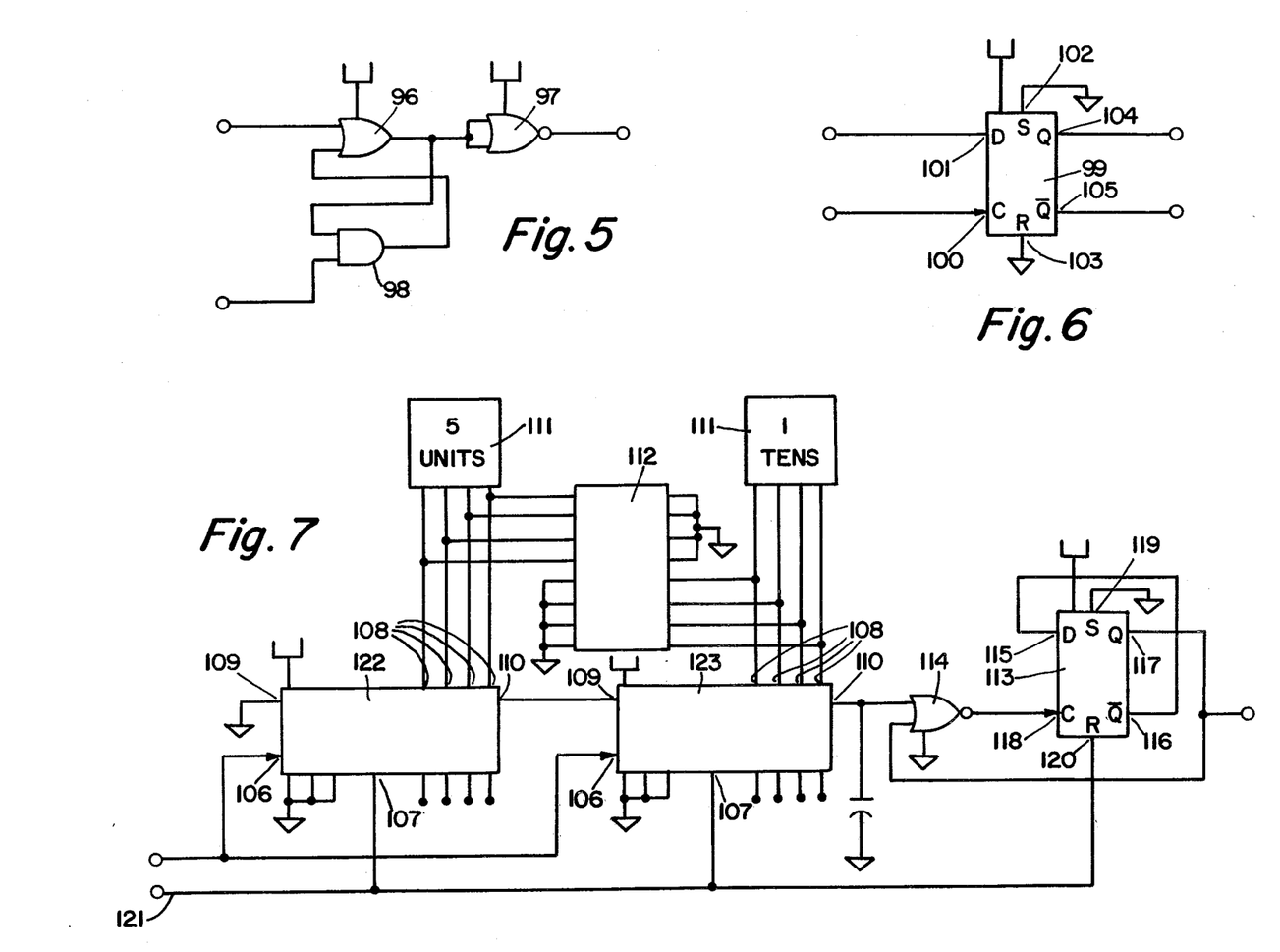
FIG. 5 is a schematic diagram of a flip-flop for use in the system of FIG. 2.
FIG. 6 is a schematic diagram of a synchronizing circuit for use in the system of FIG. 2.
FIG. 7 is a schematic diagram of an adjustable digital timer for use in the system of FIG. 2.

FIG. 5 is a schematic diagram of the timer-enable circuits 13, 37 used in the system of FIG. 2 when the digital timer of FIG. 4 is utilized. The timer-enable circuit comprises a two-input OR gate 96, an inverter 97, and a two-input AND gate 98. The inverter 97 can comprise a two-input NOR gate with its inputs connected together to comprise the input to the inverter. A first input to the OR gate 96 is to be connected to the output of the photocell latch 8 for the pull-in enable 13, or the output of the dispenser-control latch 41 for the drop-out enable 37. A second input to the OR gate 96 is connected to the output of the AND gate 98. The output of the OR gate 96 is connected to the input of the inverter 97 and to one input of the two-input AND gate 98. The output of the AND gate 98 is connected to the second input of the OR gate 96. The second input to the AND gate 98 is to be connected to the output of the respective timer circuit 23, 24. This enable circuit is effective to synchronize the effect of a timer with the occurrence of a photocell signal or dispenser control latch signal. Because of this circuit, a timer is only effective when its output period starts at a time other than when the output of the respective latch is in a high state. Thus, if the photocell latch 8 goes to a high state while the pull-in timer 23 is in an untriggered state (a high state in this circuit), then the effect of the timer will be nullified if triggered while the latch is in the high state. However, if the photocell latch 8 changes to a high state while the pull-in timer 23 is already in a timing cycle (low state in this circuit) state, the effect of the timer 23 will not be disabled.

If a timer were used which provided a high state during its timing cycle, either an inverter could be interposed between the output of the timer and the enable circuit 13, 37 or a different enable circuit could be used which would respond properly to a high state output. A similar function is provided by the drop-out timer-enable circuit with respect to the dispenser-control latch 41 and the drop-out timer 37.

FIG. 6 is a schematic diagram of the synchronizing circuit used in the system of FIG. 2. The synchronizing circuit comprises a D-type flip-flop 99. Its clock input 100 is to be connected to the 128 kilohertz output 15 of the crystal clock 14. The D input 101 is to be connected to the output of the pulse tachometer 6. The set 102 and reset 103 inputs to the flip-flop 99 are grounded. The Q output 104 of the flip-flop 99 is to be connected to the input of the "Q" one-shot 28 and $\overline{Q}$ output 105 is to be connected to the "$\overline{Q}$" one-shot 29. The operation of the circuit is such that the logic level presented at the D input 101 to the flip-flop 99 will be transferred to the Q output 104 on the rising edge of a pulse supplied to the clock input 100 to the flip-flop 99. The clock rate to the synchronizing circuit is selected to be substantially higher (in this case 128 kilohertz) than the maximum output rate of the pulse tachometer 6. Thus, the output of the synchronizing circuit 17 is slightly behind the output of the tachometer 6 in time. However, because of the high pulse rate to the clock input 100 of the flip-flop 99 this slight lag is insignificant in the operation of the circuit, but does provide synchronization between the output of the pulse tachometer 6, the system clock 14 and other control functions. The Q and $\overline{Q}$ outputs 104, 105 are complementary, and thus provide output signals which are out of phase with each other. When these outputs Q 104 and $\overline{Q}$ 105 are fed to the individual one shots 28, 29, the one shots 28, 29 provide short duration pulses which are also out of phase with each other at least to the extent that their respective rising edges do not occur when the other is in a high state.

FIG. 7 is a schematic diagram of a digital timer. As is stated above, the timers used in the system of FIG. 2 can be merely adjustable one shots. However the digital timer of FIG. 7 offers distinct advantages of accuracy and ease of calibration. The timer of FIG. 7 comprises two individual BCD decade counters 122, 123, cascaded so as to form a two decade counter, and a latch. The individual decade counters 122, 123 have clock inputs 106 and "preset" inputs 107, programming inputs 108, carry-in input 109 and carry-out outputs 110.

Thumbwheel switches 111 are provided to adjust the time duration of the timers. The outputs of the individual thumbwheel switches 111 are connected to the BCD programming inputs 108 of the decade counters 122, 123. A biasing resistor network 112 is connected to the programming inputs of the digit counters.

Upon receiving a preset signal, the total counter will be set to the number represented by the thumbwheel switches 111. Thereafter the counter will count down from this preset number on each rising edge of an input pulse received on the clock inputs 106 to the individual counters. Clock inputs for the counters are to be derived from the crystal clock 14. 1 KHz pulses are fed to the clock inputs 116 for the counters so that each unit of count represents one millisecond. Thus, with a one kilohertz clock rate, the count from 51 to zero would be 51 milliseconds.

The carry-out output 110 of the tens digit counter 107 is connected to a latching circuit so that the timer can only be triggered once, until it is again preset.

The latch comprises a D-type flip-flop 113 and a two-input NOR gate 114. The D input 115 to the flip-flop 113 is connected to the $\overline{Q}$ output 116 of the flip-flop 113. The Q output 117 of the flip-flop 113 acts as the output of the timer, and is connected also to one input of the two-input NOR gate 114. The other input of the NOR gate 114 is connected to the carry-out output 110 of the tens decade counter 107, and acts as the input for the latch. The output of the NOR gate 114 is connected to the clock input 118 of the flip-flop 113. The set input 119 to the flip-flop 113 is grounded, and the reset input 120 is connected to a common line with the preset inputs 107 to the counter. A terminal 121 connected to all preset inputs 107 of the counter 106, 107 and to the reset input 120 to the latching circuit operates as the triggering input to the timer. Thus, when the counter is preset the output of the timer (Q output 117 of the flip-flop 113) is set to a low state, and the timer output 117 remains in this low state until the counter counts to zero. At a count of zero the timer output 117 changes to a high state and remains in this high state until the timer is again preset or triggered.

SYSTEM OPERATION

Operation of the system can be more easily understood by combined reference to FIGS. 1 and 2. System operation can be divided into two periods: an updating period and an operating cycle. During the updating period no articles 2 to be treated have been sensed. During this time the periodic update circuit 19 provides a triggering signal ten times per second to the timers 23, 24. The triggering signal from the periodic update circuit 19 causes the timers 23, 24 to provide a signal for a preselected duration. The preselected duration of the timers 23, 24 corresponds to the fixed time delay characteristics of the operating device 4. For example, if the turn-on delay time of a dispenser 4 is 10 milliseconds, then the turn-on timer will have a duration of ten milliseconds. If the photocell latch 8 is in a low state (operating cycle has not begun) the pull-in timer-enable circuit 13 will provide a high level at its output 42 for the duration of the pull-in timer output. The rising edge of the output of the pull-in timer-enable circuit 13 causes the lead-length reset one-shot 50 to be triggered through the first OR gate 43. This reset one-shot 50 will cause the lead-length counter 49 to be set to the preselected count and resets the photocell latch 8. The high level output of the pull-in timer-enable circuit 13 causes pulses from the $\overline{Q}$ one-shot 29 pulsing circuit to be gated through the second AND gate 31 to the third two-input OR gate 46. Therefore pulses are fed during this duration from the $\overline{Q}$ one-shot 29 to the lead-length counter 49. The effect of counting pulses from this $\overline{Q}$ one-shot 29 is to compensate the counter 49 for the line travel in ten milliseconds (in this example). That is, the counter 49 is counted down for 10 milliseconds. The net effect of this counting down for 10 milliseconds is to cause the counter 49 to reach a count of zero 10 milliseconds earlier when eventually triggered by the photocell 3. Thus it can be seen that the counter 49 is updated ten times per second so that it is updated in close proximity in time to any triggering by the photocell 3. (No longer than 1/10 second prior to photocell activation).

At any line speed therefore the number of counts received by the counter 49 during a compensation cycle will depend on the line speed of the conveyor 1. At higher line speeds the conveyor will travel further and hence provide more pulses or counts to the counter 49 in the same ten millisecond time period. Thus, the counter 49 is caused to count down by the number of pulses received in ten milliseconds at the present line speed.

When an object 2 is sensed, the photocell 3 causes the photocell latch 8 to change to a high state and remain there until reset. The output of the photocell latch 8 has two effects. First, a high state on the output 10 of the photocell latch 8 will disable the pull-in timer-enable circuit 13 so that the output of this timer-enable circuit 13 will remain in a low state if the pull-in timer 23 is not in a timing cycle, until the photocell latch 8 is reset. However, if the pull-in timer 23 has been triggered but has not yet completed its duration at the time the photocell latch 8 is triggered, the pull-in timer-enable circuit 13 will continue in the high state for the duration of the timer period. The high level of the photocell latch 8 also causes the pulses from the Q one-shot 28 to be gated through the first AND gate 11. The output of this first AND gate 11 is fed to the third OR gate 46 so that the lead-length counter 49 counts pulses until the photocell latch 8 is reset. At a count of zero the lead-length counter provides an output at its carryout output 48 which causes the lead-length reset one-shot 50 to be activated through the first OR gate 43. Because the photocell latch 8 has been activated, the output of the lead-length reset one-shot 50 will be gated by the output of the fifth AND gate 12 to the dispenser control latch 41 to turn it on.

The lead-length counter 49 is counted down by pulses from the tachometer 6 through the synchronizing circuit 17 and one-shots 28, 29. If a compensating cycle has begun, it will continue even after the photocell latch 8 is triggered. Pulses from both the Q and $\overline{Q}$ one-shots 28, 29 in such a case will be gated through the third OR gate 30 to the lead-length counter 49. Thus, the lead-length counter 49 may count two pulses for each tachometer output pulse, since the pulses from the Q and $\overline{Q}$ one-shots 28, 29 are out of phase with each other. Thus, the counter 49 is compensated even if a photocell signal is received during the compensation period. Thus, the counter 49 is counted down for the time required for the object 2 to travel to the proper treating position, less the time it will take the dispenser 4 to completely turn on. The operation of the bead-length section of the control circuit is identical to that of the lead-length section of the circuit except that there is no photocell 3 of photocell-latch circuit 8 in the bead-length portion of the circuit. The dispenser-control latch 41 operates to perform in an analogous manner in the bead-length section of the circuit as the photocell-latch 8 performed in the lead-length section of the circuit.

It can be appreciated that the photocell latch 8 is reset independently of the dispenser-control latch 41. Therefore, a new article 2 may trigger the circuit even while the bead-length counter 56 is in its counting cycle. That is, even while adhesive is being applied. The circuit does not require the bead-length counter 56 to have completed its cycle in order to be triggered by a new object 2. Thus, objects 2 may be positioned closer with respect to each other on the conveyor 1.

It can also be appreciated that this circuit is usable with systems other than adhesive dispensing systems. It can be used with any system wherein operation must be delayed in response to a condition which can be represented by a series of pulses and compensation must be provided for fixed-time delays in the operation of a responsive device between the time a control signal is applied and the time when activation actually occurs.

Having described my invention I claim:

1. A controller to activate a responsive device at a preselected time after initiating event, for use with articles moving on a conveyor, comprising:
   a distance sensing circuitry adaptable to provide output pulses for preselected increments of conveyor travel;
   triggering means adaptable to be responsive to an initiating event, to provide an output signal upon the occurrence of said initiating event;
   at least a first counter for said pulses from said distance sensing circuitry, said counter being settable to a preselected count within a range, the counter being controllable to count in response to the output signal of said triggering means, and which provides an output signal at a predetermined count; and
   an update control circuit responsive to said counter, and said triggering means to be effective to set the counter to said preselected count prior to the occurrence of said initiating event;
   wherein the output signal of said counter is adaptable to control the activation of said responsive device.

2. The apparatus of claim 1 wherein said predetermined count at which said counter provides said output signal is a count of zero.

3. The apparatus of claim 1 which further comprises:
   a second counter for said output pulses from said distance sensing circuitry, said second counter being settable to a preselected count within a range, said second counter being controllable to count output pulses in response to said output signal of said first counter, and which provides an output signal at a predetermined count; and means to set said second counter to said preselected count;

wherein the output signal of said second counter is adapted to deactivate said responsive device.

4. The apparatus of claim 1 wherein said first counter provides said output signal at a count of zero and said counter counts down.

5. The apparatus of claim 1 which further comprises:
a triggerable timer circuit providing an output signal for a time duration settable to a time corresponding to fixed delay characteristics in the operation of said responsive device and which causes said first counter to count output pulses after said preselected count has been set, said pulses being counted for the duration of the timing signal output of said timer, wherein said update control circuit is effective to trigger said timer circuit.

6. The apparatus of claim 1 wherein the distance sensing circuitry further comprises:
a pulsing circuit having first and second outputs, each of which provides an output pulse for preselected increments of conveyor travel, said pulses from said first and second outputs from said pulser circuit being out of phase with each other, wherein the initiating event causes said counter to count output pulses from said first output; and wherein said timer circuit causes said counter to count pulses from said second output for a time determined by said timer circuit.

7. The apparatus of claim 6 wherein said timer comprises a clock pulse generating circuit and a timer-counter which counts from a second preselected count to a second predetermined count and causes said first counter to count output pulses from said second output of said pulsing circuit while said timer-counter is counting from its preselected count to its predetermined count.

8. The apparatus of claim 7 wherein said second predetermined count is zero.

9. The apparatus of claim 6 which further comprises:
a second counter for said output pulses from said pulsing circuit, said second counter being settable to a second preselected count within a range, said second counter being controllable to count output pulses in response to said output signal of said first counter and which provides an output signal at a second predetermined count;

means to set said second counter to said second preselected count;

wherein the output signal of said second counter is adapted to deactivate said responsive device;

the apparatus further comprising:
a second triggerable timer circuit triggerable by said means to set second counter and providing a triggerable output signal settable for a time duration corresponding to deactivation delay characteristics of said responsive device, said second timer being operable to cause said second counter to count pulses from said second output of said pulsing circuit after said second counter has been set to said second preselected count for said second counter, said counting caused by said second timer continuing for the duration of the timing signal output of said second timer circuit;

wherein the output signal of said first counter causes said second counter to count output pulses from said first output of said pulsing circuit; and wherein said second timer circuit causes said second counter to count pulses from said second output of said pulsing circuit for a time determined by said second timer circuit.

10. The apparatus of claim 9 wherein said update circuit and said means to set said second counter are effective to periodically set said first and second counters to their respective preselected counts and to trigger said respective timers, except when a respective counter is counting from its preselected count to its predetermined count.

11. The apparatus of claim 9 wherein at least one of the timers comprises a clock pulse generating circuit and a timing counter for said clock pulses, settable to a third preselected count and whose timing duration is determined by the time required for said timing counter to count from said third preselected count to a third predetermined count.

12. The apparatus of claim 1 which further comprises triggerable compensation means responsive to said update control circuit to compensate for fixed-time delay characteristics of said responsive device wherein the update control circuit is effective to set said counter to said preselected count and trigger said compensation means periodically, except while said counter is counting from said preselected count to said predetermined count.

13. The apparatus of claim 1 which further comprises:
a second counter for said output pulses from said distance sensing circuitry, said second counter being settable to a second preselected count within a range, said second counter being controllable to count in response to said output signal of said first counter, and which provides an output signal at a second predetermined count; and means to set said second counter to said second preselected count;

wherein the output signal of said first counter is adapted to control the activation of said responsive device, and the output signal of said second counter is adapted to deactivate said responsive device;

wherein the first counter and the second counter are settable to their respective preselected counts by said update circuit and said means to set said second counter, independently of each other.

14. The apparatus of claim 13 which further comprises triggerable compensations means associated with each counter to compensate for fixed time-delay characteristics of said responsive device wherein the update control circuit and said means to set said second counter are effective to set said first and second counters to their respective preselected counts and trigger said compensation means periodically, except while a respective counter is counting from its preselected count to its predetermined count.

15. The apparatus of claim 6 wherein the update control circuit is effective to set said counter to said preselected count and trigger said timer periodically, except while said counter is counting from said preselected count to said predetermined count.

16. A control circuit to activate a responsive device for use in conjunction with a conveyor comprising:

a sensor means to detect articles moving on the conveyor at a first location and to provide an output signal thereupon;

pulse tachometer means to provide output pulse signals for each predetermined increment of conveyor travel;

a triggerable timer means operative to provide an output signal for a time duration corresponding to delay characteristics of said responsive device;

a pulse generating means to provide output pulses for each increment of conveyor travel, the pulses from said pulse generating means being out of phase with said pulses from said pulse tachometer means;

a counter means automatically settable to a count representative of the distance between said sensor means at said first location and a responsive device at a second location plus the distance from the triggering edge of said article to the point at which said responsive device is to operate on said article, said counter being operative to count pulses from said pulse tachometer means and from said pulse generating means and being operative to provide a carry-out signal at a count of zero;

update circuit means to periodically trigger said timer means and sets said counter to said representative count, except while said counter is counting to said carry-out signal;

control means to enable said counter to count pulses from said pulse generating means only during said output signal from said timer means, and count pulses from said pulse tachometer means in response to the signal from said sensor means at least until a carry-out signal is generated by said counter means, and means responsive to said carry-out signal to activate said responsive device.

17. The apparatus of claim 16 which further comprises:

a second triggerable timer means operative to provide an output signal for a time duration corresponding to the drop-out delay characteristics of said responsive device;

a second counter means automatically settable to a second count representative of the number of said increments of said conveyor travel for which the said responsive device is to operate, said counter being operative to count pulses from said pulse tachometer means and from said pulse generating means and being operative to provide a carry-out signal at a count of zero;

independent update circuit means for said second counter and said second triggerable timer means to periodically, except while said second counter is counting to said carry-out signal, trigger said second timer means and set said second counter to said second representative count;

independent control means to enable said second counter to count pulses from said pulse generating means only during said output signal from said second timer means and to count pulses from said pulse tachometer means in response to the carry-out signal from said first counter means at least until a carrry-out signal is generated by said second counter; and means responsive to said carry-out signal of said second counter to deactivate said responsive device.

18. The apparatus of claim 17 wherein said update circuits further comprise control circuitry to disenable respective update circuits while a respective counter is counting from its representative count to its carry-out signal in response to a said output signal of said sensor means.

19. A method of controlling a responsive device to treat articles moving on a conveyor comprising the steps of:

sensing articles moving on said conveyor at a first location and providing an output signal thereupon;

generating first and second pulses out of phase with each other for each predetermined increment of conveyor travel;

setting a counter to a count representative of the number of increments of conveyor travel between said first location and the location of said article where said responsive device is to operate on said article;

counting first pulses down from said set representative count to zero in response to sensing an article traveling on said conveyor, and generating a carry-out signal at zero count;

periodically, except while said counter is counting to said carry-out signal, triggering a timer means operative to provide an output signal for a time duration corresponding to delay characteristics of said responsive device and setting said counter to said representative count;

counting said second pulses with said counter only while providing said output signal from said timer; and activating said responsive device in response to said carry-out signal;

counting said second pulses with said counter only while providing said output signal from said timer; and activating said responsive device in response to said carry-out signal.

20. A control circuit for a responsive device used to treat articles moving on a conveyor comprising:

a sensor located upstream from said responsive device and effective to provide an output in response to articles moving therepast on said conveyor;

means to provide at least first pulses representing incremental conveyor travel;

a counter automatically settable to a first count and controllable to count said first pulses from said first count to a second count, and to provide an output signal effective to control operation of said responsive device at said second count, the difference between said first count and said second count representing conveyor travel between the time said sensor provides an output signal and the time the article is to be treated;

periodic update means to periodically, except while said counter is counting from said first count to said second count, cause said counter to be adjusted in count by a count representative of current conveyor travel in the time required for said responsive device to operate after receiving a control signal; and control circuitry means to sequence the response of said counter to said sensor signal and said periodic update means.

21. The apparatus of claim 20 wherein:

said periodic update means comprises a triggerable timer, which, upon triggering, provides an output settable to a time duration corresponding to fixed-time system delays; and means to trigger said timer periodically;
and wherein the control circuitry further comprises means to provide second pulses for each increment of conveyor travel but which are out of phase with said first pulses; and
an enabling circuit responsive to the triggering of said sensor and responsive to said output of said timer to cause said counter to count said second pulses for the time duration of said timer only if said timer is triggered while said counter is not counting said first pulses.

* * * * *